United States Patent Office 2,888,481
Patented May 26, 1959

2,888,481

PERFLUOROALKYL PHOSPHITE AND PHOSPHONATE LUBRICANTS AND LUBRICANT ADDITIVES

Glenn R. Wilson, Detroit, Mich., assignor to Ford Motor Company, Dearborn, Mich., a corporation of Delaware No Drawing. Application February 4, 1957
Serial No. 637,864

3 Claims. (Cl. 260—461)

This invention deals with the lubrication art and is particularly concerned with the use of certain perfluoroalkyl phosphorous esters for use as an additive.

It is an object of this invention to provide a lubricant or lubricant additive which exhibits thermal, oxidative, and hydrolytic stability.

With this object in mind, my invention will become apparent upon reading the following specification.

Numerous types of organic materials have been prepared and tested for high temperature applications, each family of compounds has certain advantages and disadvantages. For example dibasic acid esters exhibit excellent lubricity but only fair hydrolytic and thermal stability. The organophosphorus compounds possess good lubricity, fair thermal stability and poor hydrolytic stability. On the other hand, the perfluorocarbons display excellent thermal stability but possess poor lubricity for steel on steel.

I have discovered that a composite structure of certain organophosphorus and perfluorocarbons such as perfluoroalkyl phosphites and perfluoroalkyl phosphonates combine the thermal and hydrolytic stability of the perfluorocarbon with the desirable lubricating properties of the organophosphorus compounds.

As indicated by the phosphite structure I and the phosphonate structure II, each contains tertiary groupings which are generally thought to be prone to hydrolysis. However, the perfluoroalkyl group increases the hydrolytic stability of the compounds by its effect on the ester linkage

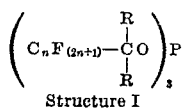

Structure I

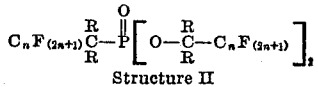

Structure II $n = 3-12$
R = any alkyl or perfluoroalkyl group containing 1–4 carbon atoms

EXAMPLE 1.—PREPARATION OF TRIS(1,1-DIMETHYLHEPTAFLUOROBUTYL) PHOSPHITE

This compound was prepared according to the following series of reactions:

(1) $C_3F_7\overset{O}{\underset{\|}{C}}OC_2H_5 + 2CH_3MgI \longrightarrow C_3F_7C(CH_3)_2OMgI + C_2H_5OMgI$ (2) $C_3F_7C(CH_3)_2OMgI + C_2H_5OMgI + 2H_2O \longrightarrow$
$C_3F_7C(CH_3)_2OH + C_2H_5OH + 2MgI(OH)$ (3) $C_3F_7C(CH_3)_2OH + Na \longrightarrow C_3F_7C(CH_3)_2ONa + \frac{1}{2}H_2$ (4) $3C_3F_7C(CH_3)_2ONa + PCl_3 \longrightarrow$
$(C_3F_7C(CH_3)O)_3P + 3NaCl$ The 1,1-dimethylheptafluorobutanol in Equation 2 was prepared via the usual Grignard procedure.

The sodium salt of the carbinol, Equation 3, was prepared by reacting 120 g. of the carbinol with 12.1 g. of metallic sodium sand in 200 ml. of toluene. The solution of the sodium salt was reacted with 23.4 g. of phosphorus trichloride, the sodium chloride removed from the reaction mixture and the filtrate fractionated at reduced pressure. The tris(1,1-dimethylheptafluorobutyl) phosphite was isolated as a fraction boiling at 142–9 C. at 17–18 mm. of mercury.

EXAMPLE 2.—PREPARATION OF BIS(1,1-DIMETHYLHEPTAFLUOROBUTYL) - 1,1 - DIMETHYLHEPTAFLUOROBUTYLPHOSPHONATE

A mixture of 25 g. of tris(1,1-dimethylheptafluorobutyl) phosphite and 10 g. of 1,1-dimethylheptafluorobutyl chloride was refluxed for 4½ hours at 150–3 C. and the mixture fractionated. A fraction boiling at 68–77 C./ 5.7–7.5 mm. was obtained. Since the phosphite and phosphonate have identical empirical formulas and both contain P—O—C bonds, their infrared absorption spectra were compared for determining whether or not any conversion of the phosphite to phosphonate had occurred. The infrared spectra, which gave strong evidence for a direct P—C bond absent in the phosphite, indicated conversion of the phosphite to the phosphonate had occurred.

The lubricity of the phosphite prepared according to the procedure described in Example 1 was measured in a precision shell four ball wear tester. The wear-scar diameter was found to be 0.55 mm. at the conclusion of a one hour test at 200° C., 10 kg. load and 1200 r.p.m. This is superior to the wear scar diameter of 0.93 mm. obtained in a test of (2-ethylhexyl) sebacate, a typical lubricant, at 200° C., 10 kg. load and 1200 r.p.m. for one hour.

Tris(1,1-dimethylheptafluorobutyl) phosphite was also found to be much more thermally stable than its hydrocarbon analog tris(1,1-dimethylbutyl) phosphite, since the latter material decomposed during attempted isolation and purification. A hydrocarbon homolog, tris(tert-butyl) phosphite is known to decompose rapidly at 80° C. while the perfluorophosphite of Example 1 can be heated at 150° C. and 175° C. without apparent decomposition. The hydrolytic stability of the perfluoro phosphite ester also proved to be greater than its hydrocarbon homologs and analogs. Upon heating a sample of it with water in a selected ampoule at 250° F. for 72 hours the hydrolysis was observed to be only 18% compared with 50% hydrolysis for tris(n-butyl) phosphite. The results of these tests are summarized in Table I.

Table I

| Compound | Max. Stability Temp., ° C. | Hydrolysis at 250° F. for 72 hours |
|---|---|---|
| $(C_3F_7C(CH_3)_2O)_3P$ | >175° | Percent 18 |
| $(C_3H_7C(CH_3)_2O)_3P$ | decomposes during preparation. | |
| $(C_2H_5C(CH_3)_2O)_3P$ | 80° | |
| $(C_4H_9O)_3P$ | | 50 |

I have limited this invention to compounds wherein the perfluoro-group is limited to from 3–12 hydrocarbons. However, the upper limit has been imposed merely because I have been unable to obtain the necessary starting material to synthesize a perfluoroalkyl phosphorous ester having a perfluoro group of sufficient length. Should the need for higher molecular weight lubricants become apparent and longer chain starting compounds become available, the perfluoro-alkyl ester prepared from them obviously will perform very well as a lubricant or additive.

I claim:

1. A composition of matter having the formula:

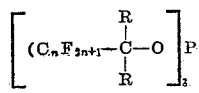

wherein $n$ is any number from 3–12, and R is an alkyl group having from 1–4 carbon atoms.

2. A composition of matter having the formula:

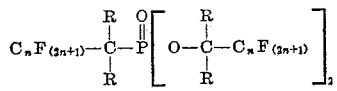

where $n$ is equal to a number from 3–12 and R is an alkyl group having 1–4 carbon atoms.

3. A lubricant selected from the group consisting of fluorinated alkyl phosphites and fluorinated alkyl phosphonates in which the fluorinated alkyl phosphites correspond to the formula

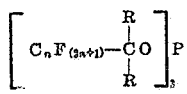

and in which the fluorinated alkyl phosphonates correspond to the formula

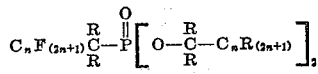

wherein $n$ is any number from 3–12, and R is an alkyl group having from 1 to 4 carbon atoms.

References Cited in the file of this patent

UNITED STATES PATENTS

| | | |
|---|---|---|
| 2,302,703 | Lincoln | Nov. 24, 1942 |
| 2,397,381 | Smith | Mar. 26, 1946 |
| 2,520,393 | Fletcher | Aug. 29, 1950 |
| 2,559,754 | Bittles et al. | July 10, 1951 |
| 2,668,842 | Tolkmith | Feb. 9, 1954 |
| 2,708,204 | Bell et al. | May 10, 1955 |
| 2,712,029 | Van Winkle | June 28, 1955 |
| 2,754,317 | Conly | July 10, 1956 |